(12) United States Patent
Stefanini

(10) Patent No.: US 8,033,334 B2
(45) Date of Patent: Oct. 11, 2011

(54) TREATING LIQUIDS IN OIL EXTRACTION

(75) Inventor: Daniel Stefanini, Beeston (GB)

(73) Assignee: Hydropath Holdings Limited, London (GB)

( * ) Notice: Subject to any disclaimer, the term of this patent is extended or adjusted under 35 U.S.C. 154(b) by 267 days.

(21) Appl. No.: 12/376,783

(22) PCT Filed: Aug. 9, 2007

(86) PCT No.: PCT/GB2007/003031
§ 371 (c)(1),
(2), (4) Date: Mar. 30, 2009

(87) PCT Pub. No.: WO2008/017849
PCT Pub. Date: Feb. 14, 2008

(65) Prior Publication Data
US 2010/0186958 A1  Jul. 29, 2010

(30) Foreign Application Priority Data
Aug. 11, 2006  (GB) .................................. 0615987.5

(51) Int. Cl.
*E21B 37/06* (2006.01)
*E21B 43/00* (2006.01)
(52) U.S. Cl. .................. 166/304; 166/75.11; 166/75.12; 166/244.1; 166/369; 137/13; 507/90
(58) Field of Classification Search .................. 166/65.1, 166/75.1, 75.12, 244.1, 248, 304, 369, 902; 137/13; 210/696; 507/90
See application file for complete search history.

(56) References Cited

U.S. PATENT DOCUMENTS

| 3,891,394 A | | 6/1975 | Smith | |
|---|---|---|---|---|
| 4,524,827 A | | 6/1985 | Bridges | |
| 4,790,375 A | * | 12/1988 | Bridges et al. | 166/60 |
| 4,865,747 A | | 9/1989 | Larson | |
| 5,348,050 A | | 9/1994 | Ashton | |
| 5,514,283 A | * | 5/1996 | Stefanini | 210/695 |
| 5,667,677 A | * | 9/1997 | Stefanini | 210/222 |
| 5,673,721 A | * | 10/1997 | Alcocer | 137/13 |
| 5,935,433 A | * | 8/1999 | Stefanini | 210/222 |
| 7,353,873 B2 | * | 4/2008 | Borst et al. | 166/304 |
| 2008/0067129 A1 | * | 3/2008 | Juenke et al. | 210/695 |

FOREIGN PATENT DOCUMENTS

| WO | 2006029203 | 3/2006 |
|---|---|---|
| WO | 2006067418 | 6/2006 |
| WO | 2006072125 | 7/2006 |

OTHER PUBLICATIONS

Results of Use of Magnetic Inductors of an Oil Processings at Its Production and Transport, Oil Industry, (Russian Publication) ISSN 0028-2448, Apr. 2004, pp. 81-86. No translation available.

* cited by examiner

*Primary Examiner* — George Suchfield
(74) *Attorney, Agent, or Firm* — Kirschstein, et al.

(57) ABSTRACT

A method of treating liquid, particularly an oil/water mixture, in an oil well pipe, wherein a radio frequency propagating electrical field is established in the liquid in the pipe cause the formation of seed crystals or scale-forming material in the liquid, on which seed crystals asphaltenes and/or paraffin waxes in the liquid are deposited so that they are carried through the pipe with the liquid in preference to being deposited on the pipe wall.

6 Claims, 2 Drawing Sheets

TREATING LIQUIDS IN OIL EXTRACTION

TECHNICAL FIELD

This invention relates to a method of treating liquids in pipework in oil-production installations.

BACKGROUND OF THE INVENTION

The extraction of oil from underground sources is, in principle, straightforward. A hole is drilled down to an oil-bearing ground stratum and pipework placed in the hole through which oil can be raised to ground surface level. In some oil wells the oil may be under pressure in the oil bearing stratum so it flows to the surface without any assistance, but in many wells assistance may be required either by pumping to draw up the oil or by the injection of water down to the oil-bearing stratum so that oil comes to the surface mixed with the water. The water injected to the oil-bearing stratum may be sea water, and may be heated so that the oil, if viscous, flows more readily. In this case, what comes to the surface will be an oil-water mixture of which the oil content may well be 10% or more One problem associated with oil extraction in this way is that of the formation of waxes and scale in the pipe through which the oil/water mixture comes to the surface. As pressure is reduced the further up the pipe the mixture rises, the water become super-saturated and precipitates calcium carbonate and other minerals in the form of aragonite, berite, pyrite, and silicates on the surfaces of the production pipeline. Additionally, asphaltenes and paraffin waxes precipitate (as pour point is reached) from the oil content of the mixture again forming on the surfaces of the pipe and gradually reducing the rate of production. In addition, calcium mineral deposits, and biofouling, also cause problems in the water injection wells and the high pressure pumping system necessary for water injection, reducing oil production.

It is broadly the object of the present invention to address the aforementioned problem of pipeline blockage by deposition of minerals, waxes and other substances.

SUMMARY OF THE INVENTION

According to one aspect of the invention, we provide a method of reducing deposition of material from an oil/water mixture in an oil well pipe, comprising establishing a radio frequency propagating electromagnetic field in the mixture in the pipe.

The electromagnetic field may be established by providing a core element of magnetically conductive material surrounding the pipe at a position, and establishing a radio frequency magnetic flux in the core element for generating a propagating electric field in liquid in the pipe.

The radio frequency magnetic flux in the core element may be established by providing a coil through which the core element passes, the coil being energised by radio frequency electrical signals.

The electrical signals may be of square wave form or sinusoidal, or possibly other wave forms may be utilised. Preferably the signal is pulsed, each pulse being of a diminishing sinusoidal wave form.

When dissolved in water minerals such as calcium carbonate and bicarbonate, and magnesium carbonate and bicarbonate, for example, exist as positively and negatively charged ions. When a maximum amount of a substance that can be dissolved in solution is reached, for a given temperature and pressure, the solution is said to be saturated and if conditions change so that the saturation concentration of a substance is exceeded, the solution is said to be super-saturated. If sufficient seed crystals of the substance are present in the solution, the dissolved substance(s) will crystallise out of the solution and this is what can lead to deposition of scale in pipes.

To form seed crystals, the positive and negative ions of the substance in solution have to be grouped together. Because of the distribution of charges thereon, ions which comprise more than one atom may be regarded as dipoles, and under the influence of an electric field such ions are aligned to the field and attracted towards the oppositely-charged end of the applied field. This process considerably increases the chances of collision between charged particles of opposite charge, as they will be moving in the opposite direction from one another (especially if the electrical field is alternating), and leads to an increased growth of the clusters of oppositely charged ions of the dissolved substance.

In addition, the electric field reduces the attractive forces which cause water molecules to hold onto the ions, with the result that the charged particles join to form a seed crystal. Such tiny seed crystals have a surface charge that attracts large numbers of ions and clusters thereof (that are available if the solution is super-saturated) and such seed crystals grow rapidly and provide for growth of crystals (i.e. precipitation of the dissolved substance) until the solution is no longer super-saturated. If the pressure is reduced (many scale-forming substances have decreasing solubility in water with reducing pressure) crystal growth resumes until the amount of dissolved substance has again reduced.

Such creation of seed crystals in the solution is referred to as homogeneous seed crystals; crystals can also form on any alien substance or on a plane that has sharp points on its surface. Electrical charges will be concentrated on any such points, which will attract charged particles to begin the process of crystallisation. If no homogeneous seed crystals are available in that part of the solution, a dissolved substance is likely to crystallise at the heterogeneous seed crystals, which are likely to be on the surfaces of heat exchangers or pipes. It is this which leads to scale deposition in pipes.

In accordance with the invention, the presence of the propagating electromagnetic field in a pipe facilitates the formation of homogeneous seed crystals in water in the pipe, and hence the formation of crystals in the water, to be carried through the pipe by the water, rather than as scale deposited on the pipe surface. Homogeneous seed crystals are ten times more attractive to the substance in solution than heterogeneous seed crystals on a surface, and hence crystals are more likely to occur in suspension in the water.

A homogeneous seed crystal will begin crystallisation at pressure higher than the pressure where crystallisation may start on heterogeneous seed crystals on a surface. Hence all material that is liable to precipitate from the solution is likely to have done so before heterogeneous precipitation on a surface can take place.

The process of causing precipitation of dissolved substances from the water in a pipe, enables the invention to be beneficial in terms of reducing precipitation on pipe surfaces of asphaltenes and paraffin waxes from the oil content of a mixture of oil and water. Both asphaltenes and paraffin waxes can use the seed crystals above described as seed on which to deposit suspended particles (which have an appearance resembling pearls) before pour point is reached.

Asphaltenes are high molecular weight, complex aromatic compounds typically containing oxygen, nitrogen, sulphur, and heavy metals as well as carbon and hydrogen. Whilst the crystals of scale-forming substances act as seed crystals for the deposition of the asphaltenes and paraffin waxes before pour point is reached, preventing deposition on the pipe.

Additionally, the field has a beneficial effect on corrosion of pipes.

BRIEF DESCRIPTION OF THE DRAWINGS

The invention will now be described by way of example with reference to the accompanying drawings, of which.

DETAILED DESCRIPTION OF THE INVENTION

Figure 1:
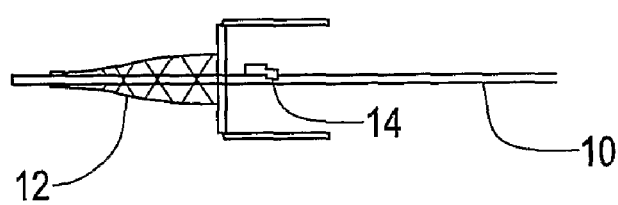
FIG. 1 illustrates apparatus for carrying out the invention in relation to an oil well pipe.

Referring firstly to FIG. 1, this illustrates an oil well pipe 10 extending downwardly in a well from ground surface level. A production rig 12 is illustrated at the top of the pipe 10, and an apparatus 14 as shown in greater detail in FIG. 2 is connected to the pipe.

Figure 2:
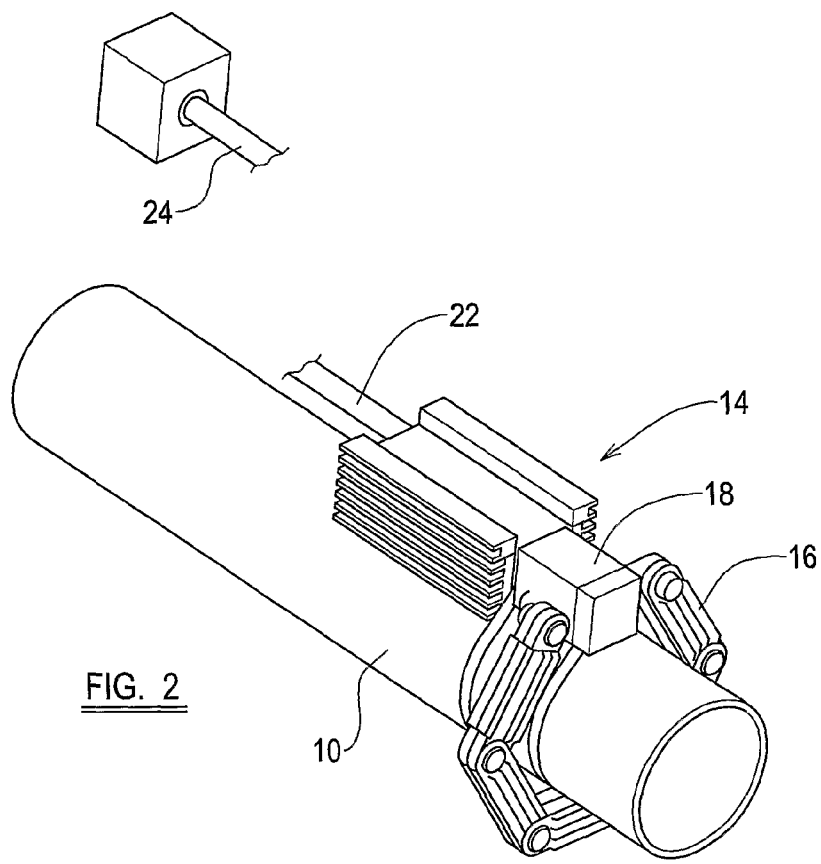
FIG. 2 illustrates an apparatus for establishing an electromagnetic field in the pipe and its contents, in accordance with the invention.

FIG. 2 shows a section of the pipe 10 with the apparatus 14 applied thereto. The apparatus 14 comprises a core element 16 of magnetically conductive material, preferably a suitable ferrite material, surrounding the pipe 10. Conveniently it comprises a number of individual elements of the magnetically conductive material, contained within respective casing parts, such elements being connected to one another by fasteners of which one or more may be removable to enable the core to be positioned around the pipe without requiring a joint in the pipe to be disconnected. The individual elements of magnetically conductive material are arranged to establish an annular magnetically conductive path surrounding the pipe 10.

Figure 3:
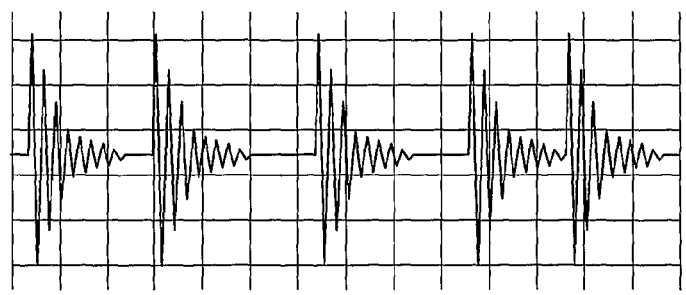
FIG. 3 illustrates the wave form of pulses applied by the apparatus.

A primarily coil of an electrical conductor is disposed in a housing 18, associated with the core element 16, the coil surrounding the core element. The coil is connected by wiring 22 to a radio frequency signal generator unit 24. Electrical signals generated by the signal generator 22 are applied to the primary coil surrounding the magnetic core element 16. The signals are radio frequency signals and preferably are a succession of pulses each of a diminishing sine wave form as shown in FIG. 3. Other signal wave forms may be usable, e.g. "square" wave form. The application of such signals to the magnetic core 16 establishes a radio frequency electric field in the pipe 10 and oil/water mixture therein, such field being a propagating co-axial field which is established through the length of the pipe 10.

A method and apparatus for treating a fluid with radio frequency signals are disclosed in, for example, U.S. Pat. No. 5,667,677 and international published application WO2006/067418. Apparatus for use in the present invention may utilise the structures and methods disclosed in such documents.

The electromagnetic field is established at a frequency and strength so that water molecules (which are polar molecules) are not moved sufficiently to increase the temperature thereof, whilst larger molecules and ions are moved as above described to enhance the crystallisation process.

Figure 4:
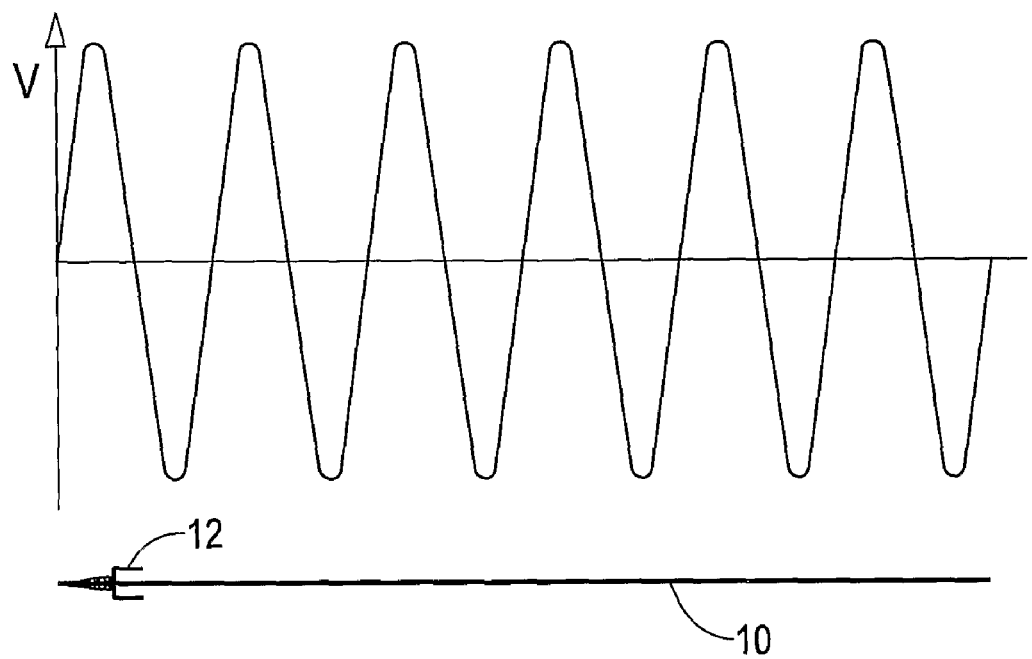
FIG. 4 illustrates the electric field produced in an oil well pipe.

The apparatus described induces a voltage in line with the axis of the pipe, producing current along the axis which in turn creates a co-axial magnetic field in and around the pipe. The co-axial magnetic field causes electron flow near the outer skin of the conductor, which may be considered to be the metal pipe together with water inside it (or the water alone, if the pipe were non-conductive). From the electrical point of view, an oil well pipe has to be regarded as an open circuit, and to generate a reasonable flow of electrons in an open circuit conductor it is necessary to provide a high frequency signal so that a standing wave voltage is generated over the length of the conductor. For example, at a frequency of around 120 khz the wave length will be 2498 m, and the quarter wave length 624.5 m. Thus voltages vary substantially along the length of the pipe, causing the effects above described. The way in which the voltage varies along the length of the pipe 10 is illustrated in FIG. 4. In the manner described above, the oil well pipe may contain, in use, a mixture of oil and water, the water (which may be sea water) having been injected into the oil-bearing stratum from which the oil is extracted to assist the oil extraction. The establishment of the propagating electromagnetic field in the pipe facilitates the formal of the homogenous seed crystals in the water content of the mixture in the pipe, so that the crystals are carried through the pipe by the water rather than being deposited as scale on the internal surface of the pipe. It has been found that asphaltene(s) and paraffin wax(es) content in the oil contained in the mixture deposit on the seed crystals in the water, so that they also are carried through the pipe rather than deposited on the internal surface of the pipe.

Asphaltene(s) are polar molecules, and as such they will be pushed towards the centre of the pipe by the propagating co-axial field established as above described, preventing or reducing the deposition thereof on the wall of the pipe.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A method of reducing deposition of scale and/or paraffin wax and/or asphaltene from an oil/water mixture in an oil well pipe, comprising the steps of:
    establishing a radio frequency propagating electromagnetic field in the mixture in the pipe to cause homogeneous seed crystals to form in the mixture, and to deposit particles of the paraffin wax and/or asphaltene on the seed crystals; and
    carrying the seed crystals and the deposited particles through the pipe.

2. The method according to claim 1, wherein the establishing step is performed by surrounding the pipe at a position with a core element of magnetically conductive material, and by establishing a radio frequency magnetic flux in the core element.

3. The method according to claim 2, wherein the radio frequency magnetic flux in the core element is established by a coil through which the core element extends, and by energizing the coil with radio frequency electrical signals.

4. The method according to claim 3, wherein the electrical signals are of sinusoidal waveform.

5. The method according to claim 4, and the step of pu6lsing the electrical signals with each pulse being of a diminishing sinusoidal waveform.

6. An oil production installation for reducing deposition of scale and/or paraffin wax and/or asphaltene from an oil/water mixture in an oil well pipe, comprising:

means for establishing a radio frequency propagating electromagnetic field in the mixture in the pipe to cause homogeneous seed crystals to form in the mixture, and to deposit particles of the paraffin wax and/or asphaltene on the seed crystals; and means for carrying the seed crystals and the deposited particles through the pipe.

* * * * *